United States Patent
Bulawski et al.

(10) Patent No.: US 12,470,254 B2
(45) Date of Patent: Nov. 11, 2025

(54) METHODS AND SYSTEMS FOR AUTHENTICATING PHYSICAL PRODUCTS VIA NEAR FIELD COMMUNICATION TAGS AND RECORDING AUTHENTICATION TRANSACTIONS ON A BLOCKCHAIN

(71) Applicant: collectID AG, Goldach (CH)

(72) Inventors: Lukasz Jacek Bulawski, Zurich (CH); David Geisser, Goldach (CH); Philipp Harbeke, Zurich (CH); Jeremy Eugene Smith, Coral Springs, FL (US)

( * ) Notice: Subject to any disclaimer, the term of this patent is extended or adjusted under 35 U.S.C. 154(b) by 620 days.

(21) Appl. No.: 17/036,043

(22) Filed: Sep. 29, 2020

(65) Prior Publication Data

US 2021/0103938 A1 Apr. 8, 2021

Related U.S. Application Data

(60) Provisional application No. 62/909,930, filed on Oct. 3, 2019.

(51) Int. Cl.
*H04B 5/77* (2024.01)
*G06Q 30/018* (2023.01)

(52) U.S. Cl.
CPC .......... *H04B 5/77* (2024.01); *G06Q 30/0185* (2013.01); *G06Q 2220/00* (2013.01)

(58) Field of Classification Search
None
See application file for complete search history.

(56) References Cited

U.S. PATENT DOCUMENTS 8,187,998 B2   5/2012  Lindemann
8,896,647 B2   11/2014 Goldau
(Continued)

FOREIGN PATENT DOCUMENTS

AU       704581 B2      8/1997
AU    2019100668 A4     7/2019
(Continued)

OTHER PUBLICATIONS

Walk-Morris, Tatiana, "LMVH creates blockchain platform to track luxury goods," [online], published May 20, 2019, available at: <https://www.retaildive.com/news/lvmh-creates-blockchain-platform-to-track-luxury-goods/555050/ > (Year: 2019).*

(Continued)

*Primary Examiner* — Richard W. Crandall
(74) *Attorney, Agent, or Firm* — Blueshift IP, LLC; Cynthia M. Gilbert

(57) ABSTRACT

A method includes receiving, by an application executing on a first computing device, from an NFC reader, a unique identifier of an NFC tag. A second computing device stores an identification of the product and the unique identifier of the NFC tag in a blockchain. The second computing device receives, from a third computing device, a request for a determination of authenticity of the NFC tag. The second computing device requests, from the blockchain, an indication of whether the unique identifier of the NFC tag is stored in association with the identification of the product and an indication of ownership. The second computing device receives confirmation that the unique identifier of the NFC tag is stored in association with the identification of the product and the indication of ownership. The second computing device provides, to the third computing device, the confirmation.

15 Claims, 8 Drawing Sheets

(56) References Cited

U.S. PATENT DOCUMENTS

| | | | |
|---|---|---|---|
| 9,092,715 | B2 | 7/2015 | Franken |
| 9,215,809 | B2 | 12/2015 | Nieland |
| 9,387,450 | B2 | 7/2016 | Ritter |
| 9,582,690 | B2 | 2/2017 | Rietzler |
| 9,591,451 | B1 | 3/2017 | Knight |
| 9,817,367 | B2 | 11/2017 | Reinhardt |
| 9,911,017 | B2 | 3/2018 | Uhl |
| 9,922,215 | B2 | 3/2018 | Huhtasalo |
| 9,953,198 | B2 | 4/2018 | Köhler et al. |
| 9,978,643 | B2 | 5/2018 | Kriebel |
| 10,130,540 | B2 | 11/2018 | Won |
| 10,292,270 | B2 | 5/2019 | Nieland |
| 10,341,341 | B2 | 7/2019 | Fairbanks |
| 10,505,726 | B1 | 12/2019 | Andon |
| 10,558,828 | B2 | 2/2020 | Martinez De Velasco Cortina |
| 10,977,456 | B1 | 4/2021 | Davis |
| 11,348,152 | B1 | 5/2022 | Davis |
| 11,475,494 | B1 | 10/2022 | Davis |
| 11,544,519 | B2 | 1/2023 | Mcdonald |
| 11,556,726 | B2 | 1/2023 | Davis |
| 11,734,677 | B1 | 8/2023 | Kang |
| 2005/0098636 | A1 | 5/2005 | Schumacher |
| 2005/0118537 | A1 | 6/2005 | Lutz |
| 2005/0142342 | A1 | 6/2005 | Lutz |
| 2007/0061199 | A1* | 3/2007 | Montgomery ......... G06Q 30/02 705/14.53 |
| 2012/0055370 | A1 | 3/2012 | Ritter |
| 2013/0059534 | A1* | 3/2013 | Sobalvarro ............ H04W 4/50 455/41.1 |
| 2014/0044337 | A1 | 2/2014 | Rutz |
| 2014/0224867 | A1* | 8/2014 | Werner ................ G06F 16/235 235/375 |
| 2016/0019542 | A1 | 1/2016 | Eischen |
| 2016/0336198 | A1 | 11/2016 | Singleton |
| 2016/0358187 | A1* | 12/2016 | Radocchia ........... H04L 63/061 |
| 2016/0378061 | A1 | 12/2016 | Reinhardt |
| 2017/0345019 | A1* | 11/2017 | Radocchia ........... H04W 12/10 |
| 2018/0072087 | A1 | 3/2018 | Franken |
| 2018/0108024 | A1* | 4/2018 | Greco .................. H04W 4/029 |
| 2018/0211207 | A1 | 7/2018 | Maijala |
| 2019/0172055 | A1* | 6/2019 | Hale ................ G06K 19/06187 |
| 2020/0082388 | A1* | 3/2020 | Wang .................. G06Q 20/3678 |
| 2021/0148819 | A1 | 5/2021 | Everett |
| 2021/0216647 | A1* | 7/2021 | Sarhaddar ............ G06F 21/604 |
| 2022/0180375 | A1 | 6/2022 | Chen |
| 2022/0215382 | A1 | 7/2022 | Chen |
| 2022/0284447 | A1 | 9/2022 | Bulawski |
| 2022/0391884 | A1 | 12/2022 | Panzavolta |
| 2023/0031817 | A1 | 2/2023 | Mulas |

FOREIGN PATENT DOCUMENTS

| | | |
|---|---|---|
| CA | 2735198 A1 | 3/2010 |
| CN | 102947102 A | 2/2013 |
| CN | 105658736 A | 6/2016 |
| CN | 106022681 A | 10/2016 |
| CN | 106157428 A | 11/2016 |
| CN | 106878318 A | 6/2017 |
| CN | 107622399 A | 1/2018 |
| CN | 107679876 A | 2/2018 |
| CN | 107730176 A | 2/2018 |
| CN | 107730277 A | 2/2018 |
| CN | 107730278 A | 2/2018 |
| CN | 107730279 A | 2/2018 |
| CN | 107730280 A | 2/2018 |
| CN | 107944892 A | 4/2018 |
| CN | 107944894 A | 4/2018 |
| CN | 107994982 A | 5/2018 |
| CN | 108009834 A | 5/2018 |
| CN | 108063826 A | 5/2018 |
| CN | 108075493 A | 5/2018 |
| CN | 108108964 A | 6/2018 |
| CN | 108111299 A | 6/2018 |
| CN | 108133023 A | 6/2018 |
| CN | 108154243 A | 6/2018 |
| CN | 108197952 A | 6/2018 |
| CN | 2083351190 U | 1/2019 |
| CN | 110458585 A | 11/2019 |
| DE | 102015117093 B4 | 8/2016 |
| EP | 1165764 A1 | 1/2002 |
| EP | 1439964 B1 | 7/2004 |
| EP | 1502762 B1 | 10/2006 |
| EP | 1416441 B1 | 9/2007 |
| EP | 2003607 A1 | 12/2008 |
| EP | 2603385 A1 | 6/2013 |
| EP | 2638510 A1 | 9/2013 |
| EP | 2663845 A1 | 11/2013 |
| EP | 3506549 A2 | 7/2019 |
| EP | 3582161 A1 | 12/2019 |
| EP | 4026355 A1 | 7/2022 |
| IT | 1402030 B1 | 8/2013 |
| JP | 2019122041 A | 7/2019 |
| LU | 500989 B1 | 6/2023 |
| WO | 0128778 A2 | 10/1999 |
| WO | 0227652 A1 | 4/2002 |
| WO | 02035444 A1 | 5/2002 |
| WO | 2003095225 A1 | 11/2003 |
| WO | 2015036237 A1 | 3/2015 |
| WO | 2016180518 A1 | 11/2016 |
| WO | 2019038328 A1 | 2/2019 |
| WO | 2019237096 A1 | 12/2019 |
| WO | 2021026586 A1 | 2/2021 |
| WO | 2023067185 A1 | 4/2023 |
| WO | 2023183256 A1 | 9/2023 |
| WO | 2023198583 A1 | 10/2023 |
| WO | 2023198705 A1 | 10/2023 |
| WO | 2023199131 A1 | 10/2023 |

OTHER PUBLICATIONS

Kirsch, Salma, 5 Ways NFC Technology Can Fine-Tune Your Marketing, Adobe for Business [online], published Mar. 15, 2019, available at: <https://business.adobe.com/blog/perspectives/5-ways-nfc-technology-can-fine-tune-your-marketing> (Year: 2019).*

Office Action (Non-Final Rejection) dated Sep. 5, 2024 for U.S. Appl. No. 17/826,014 (pp. 1-39).

* cited by examiner

METHODS AND SYSTEMS FOR AUTHENTICATING PHYSICAL PRODUCTS VIA NEAR FIELD COMMUNICATION TAGS AND RECORDING AUTHENTICATION TRANSACTIONS ON A BLOCKCHAIN

CROSS-REFERENCE TO RELATED APPLICATIONS

This application claims the benefit of U.S. Patent Application Ser. No. 62/909,930, filed on Oct. 3, 2019, entitled "Methods and Systems for Authenticating Physical Products via NFC Tags and Recording Authentication Transactions on the Blockchain," which is hereby incorporated by reference.

BACKGROUND

The disclosure relates to methods for authenticating products. More particularly, the methods and systems described herein relate to functionality for authenticating physical products through the use of Near Field Communication (NFC) tags and recording authentication transactions on the blockchain.

Conventionally, determining authenticity of products is a challenge for both consumers and producers, given a fast-growing counterfeit industry. Furthermore, conventional systems lack functionality allowing owners of authentic products to securely and in an authorized manner transfer ownership, manage insurance processes, prevent theft, and engage with other owners of authentic products. Nor do such conventional systems allow producers to track products in primary and secondary markets, gather data and perform analytics regarding secured transactions, or communicate with consumers regarding secured, traceable, authentic digital and physical assets.

BRIEF SUMMARY

In one aspect, a method for authenticating physical products via NFC tags and recording authentication transactions on the blockchain includes receiving, by an application executing on a first computing device, from an NFC reader, a unique identifier of an NFC tag physically connected to a product. The method includes storing, by a second computing device, in accordance with a smart contracts protocol, an identification of the product and the unique identifier of the NFC tag on a block in a blockchain. The method includes receiving, by the second computing device, from a third computing device associated with a first user, a request for a determination of authenticity of the NFC tag. The method includes requesting, by the second computing device, from the blockchain, an indication of whether the unique identifier of the NFC tag is stored in association with the identification of the product and an indication of ownership indicating whether the unique identifier of the NFC tag is associated with an owner associated with a blockchain address. The method includes receiving, by the second computing device, from the blockchain, confirmation that the unique identifier of the NFC tag is stored in association with the identification of the product and an indication of ownership indicating whether the unique identifier of the NFC tag is associated with an owner associated with the blockchain address. The method includes providing, by the second computing device, to the third computing device, the confirmation, the identification of the product, and the indication of ownership.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

The methods and systems described herein may provide functionality for authenticating physical products via NFC tags and recording authentication transactions on the blockchain. In some embodiments, the methods and systems described herein combine the following elements to create a secure product authentication ecosystem: a first computing device executing the functionality of a backend module and functionality for writing to blocks in a blockchain and querying a blockchain, providing application programming interfaces (APIs) and backend services as will be described in further detail below; a second computing device associated with a user and executing an application; and at least one near field communication device (e.g., an NFC tag). A system combining blockchain transparency and tamper-proof tags may allow for determining whether a product is associated with an authenticated transaction, for recording new transactions in the blockchain, and for providing authentication data. Such a system may allow consumers to minimize the risk of buying counterfeited products. Such a system may also include functionality allowing users and brand managers to exchange data regarding authenticated products, including through a social platform, increasing the strength of the brand and its utility to consumers. Such a system may also provide functionality allowing for the tracking of ownership transfer transactions, insurance processing, and theft prevention.

Figure 1A:
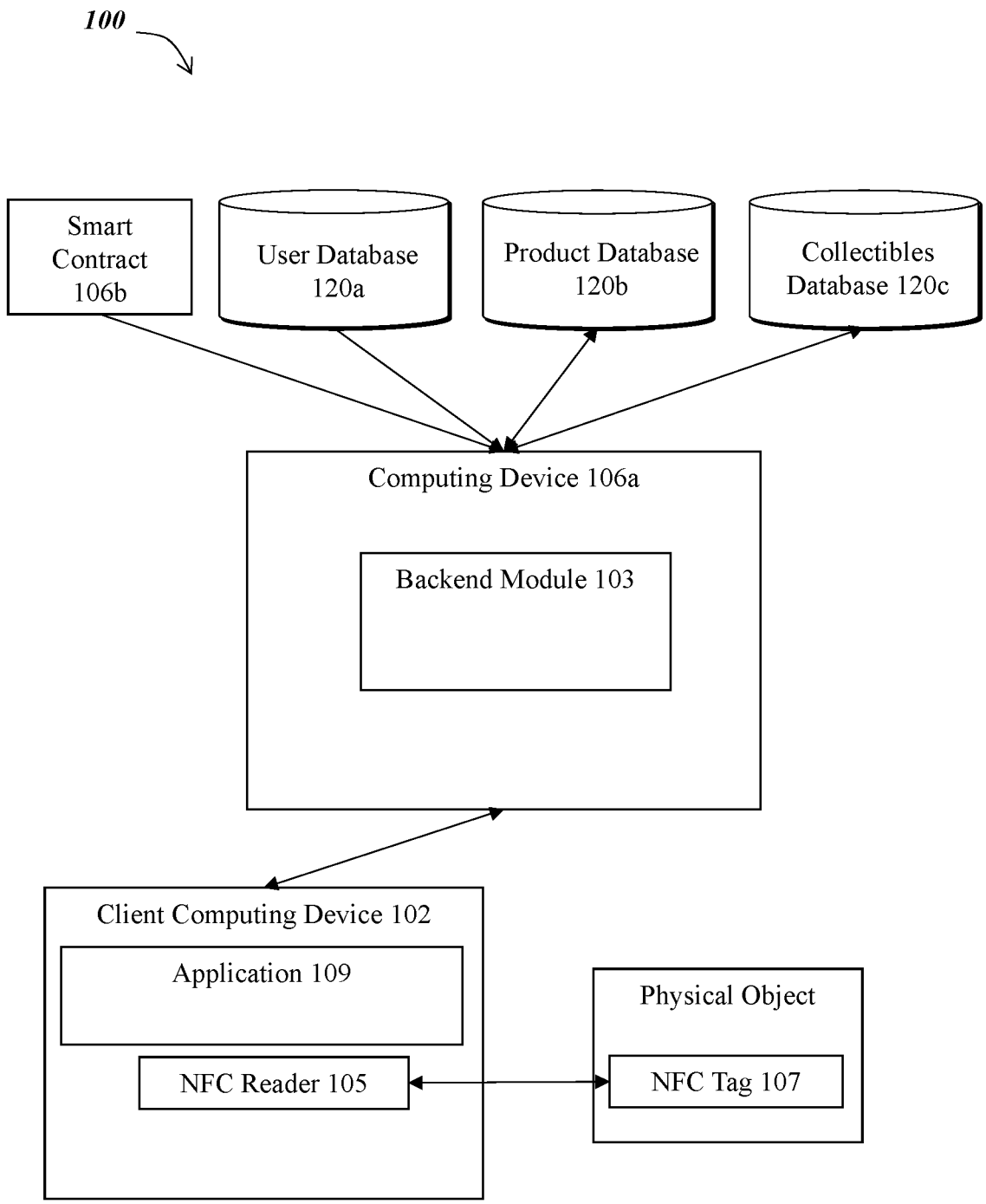
FIG. 1A is a block diagram depicting an embodiment of a system for authenticating physical products via NFC tags and recording authentication transactions on the blockchain.

Referring now to FIG. 1A, a block diagram depicts one embodiment of a system 100 for authenticating physical products via NFC tags and recording authentication transactions on the blockchain. In brief overview, the system 100 includes a client computing device 102, a computing device 106a, a smart contract 106b (e.g., a node that provides access to a smart contract), a backend module 103, an NFC reader 105, an NFC tag 107 attached to a physical object, an application 109, and databases 120a-c.

The computing devices 106a and 106b may be a modified type or form of computing device (as described in greater detail below in connection with FIGS. 4A-C) that have been modified to execute instructions for providing the functionality described herein; these modifications result in a new type of computing device that provides a technical solution to problems rooted in computer technology, such as improving authentication techniques by leveraging data stored in a blockchain in conjunction with applying NFC tags to physical objects.

In one embodiment, the system 100 uses a smart contracts protocol managed by a blockchain (private or public) to create an immutable proof of ownership for a product (e.g., a physical object) equipped with an NFC tag 107. Product ownership can be both registered and transferred by a user using the application 109. The smart contracts protocol defines a set of functions that allow for the creation, individual ownership, and unrestricted transfer of every collectible in the form of a non-fungible token asset. The metadata of these tokens includes the tag ID and a token Uniform Resource Identifier (URI), which can be used to retrieve detailed product information.

The backend module 103 may be provided as a software component. The backend module 103 may be provided as a hardware component. The computing device 106a may execute the backend module 103.

The backend module 103 may be an application that, together with an NFC reader 105 (e.g., any model available on the market) and the application 109 executing on a user computing device (e.g., the client computing device 102), allows a user to commission NFC tags and smart contract tokens (for example, and without limitation, non-fungible tokens) for physical objects. The backend module 103 may allow users to add new brands and products to a database (e.g., the product database 120b). The backend module 103 may allow users to select a product model from the database 120b and assign it to a particular NFC tag. This creates a new "collectible" and collectible information, including the association between a particular product and a particular NFC tag 107, may be stored in a smart contract 106b on a blockchain (e.g., a node 106b may act as a connection provider to the blockchain). The smart contract 106b may store, for each registered physical object, a user's public blockchain address, a tag identifier for the NFC tag 107 associated with the physical object, and the token URI.

As will be understood by those of skill in the art, a smart contract is a software component that is deployed to and stored on a blockchain. A smart contract includes a state and a set of instructions (e.g., functions) for mutating the state. To store data in a smart contract on the blockchain is to update its state using one or more instructions in the set of instructions. The system 100 may include a public blockchain. The system 100 may include a private blockchain. The system 100 may include functionality for storing data (e.g., making changes to the state of the smart contract) by sending data to a node within a blockchain network that is kept in sync with other nodes in the blockchain network. The computing device 106a (e.g., via the backend module 103) may send data to the node within the blockchain network, which then propagates the changed data to other nodes in the blockchain network. In some embodiments, the system 100 includes functionality for mirroring the state of the smart contract component in a database 120 (e.g., for speed and accessibility purposes).

As will be understood by those of skill in the art, a user's public blockchain address may be a public portion of a public/private key pair. Technically, the public key is different from the public address but since the address is deterministically derived from the public key, it may be considered to be the same as the public key. The system 100 may include functionality for storing the user blockchain address and the user public key in a database 120 while the user stores their corresponding private key on their device (e.g., the client computing device 102).

The application 109 may be provided as a software component. The application 109 may be provided as a hardware component. The application 109 may execute on the client computing device 102, which, may be a computing device as described in further detail below in connection with FIGS. 4A-4C. The application 109 may be a mobile application (e.g., an application developed for Android and iOS platforms or other mobile phone platforms). The application 109 may be provided as a web-based application (e.g., an application executed by a server that provides access to the web-based application to client computing devices).

The application 109 may include functionality for generating a unique private key, which is stored locally on the user's client computing device 102, and which allows users to create a new account for a given blockchain ecosystem on which smart contracts are deployed. The application 109 may generate a private key for a user of the client computing device 102, in accordance with one or more specifications defined for a blockchain ecosystem utilized by the computing device 106a. In one embodiment, a private key is generated as a randomly selected positive integer in the range, for example, and without limitation: [1,115792089237316195423570985008687907852837564 2790749043826051631 41518161494336].

In addition to the private key generated for a user, the system 100 may include functionality for storing one or more private keys associated with one or more NFC tags 107. Such private keys may be used to authenticate an NFC tag 107. Such private keys may be stored on the NFC tag 107. Such private keys may be stored on the computing device 106a. Such private keys may be stored in a database 120. Tag versions may be stored securely on a backend system, such as a computing device provided by a third party hosting system (such as, without limitation, GOOGLE CLOUD).

The application 109 may allow users to scan individual authenticated products connected to a unique tag ID (which may be referred to herein as "collectibles"), register their ownership of a collectible, build a personal portfolio of collectibles, and transfer their ownership of a collectible to another user. The application 109 may also allow users to retrieve detailed information about each collectible including (but not limited to) a photo, model, size, price, who authenticated it, and a history of the collectible (including, without limitation, a history of ownership of the collectible and other events linked with the collectible such as maintenance and repairs).

The NFC tag 107 may be a card tag; for example, the NFC tag 107 may be a PVC card with an NFC chip inside.

The NFC tag 107 may be a sticker tag; removing the sticker from the product destroys the NFC chip.

The NFC tag 107 may be an NFC inlay that is built into the product. As will be understood by those of skill in the art, an NFC tag may consist of an NFC inlay (e.g., all electronic parts, including an NFC chip and an antenna) and a type of packaging (e.g., a card, a sticker, a loop, and so on). For products that are equipped with the NFC tag 107 directly at a time of production, the NFC inlays may be embedded into the product (e.g., within a tongue of a shoe).

The NFC tag 107 may be a loop tag. For example, the NFC tag 107 may be a sticker tag glued to a security seal and the security seal is threaded through a hole in the product (e.g., a shoelace hole); cutting the loop breaks the seal and removing the sticker from the seal destroys the NFC chip. As another example, the NFC tag 107 may be a folding sticker with an integrated NFC chip and a long antenna loop. The antenna loop may be threaded through a hole in the product (e.g., a shoelace hole); cutting the antenna loop or opening the folding sticker changes the state of the NFC chip inside the NFC tag 107, allowing for detection of tampering.

The NFC tag 107 may include a software component. The NFC tag 107 may include a hardware component. The NFC tags may include both hardware and software. The NFC tag 107 may be provided as an NXP tag (e.g., chip type: NTAG 424 DNA). The NFC tag 107 may be encoded with a URL, version number, tag ID, and read counter, which may be used together with a securely stored, managed private key to generate a unique CMAC signature every time the chip is read. The tag ID of the NFC tag 107 and current read counter may be run through an AES-128 CMAC cipher (with a private key for a particular tag version (which is the same private key for every tag of that version) as the input key) to generate a session key. Then the entire URL (base URL, version, id, counter) is run through another round of AES-128 CMAC with the session key. The result of that calculation may be truncated and appended to the URL. The result is a unique response every time the tag is read. This ensures that the tag cannot be copied. When a tag is scanned, the backend module 103 performs the same operation and compares results. Only when they are equal and the read counter is within certain bounds, tag authenticity is confirmed. The version number may be a number of versions connected with a specific private key. The Tag ID may be the unique identifier of a particular tag. The tag private key may be AES-128 key, stored in inaccessible memory.

A variety of types of hardware may be used for the NFC Tag 107. The NFC tag 107 may be constructed in a way that does not allow for the tag to be taken off a first product and applied to a second product because when doing so, the antenna gets disconnected from the chip and the NFC tag 107 breaks. NFC tag 107 may include a mechanism for adhering to a surface (internal or external) of a physical object (e.g., when the tag is a sticker tag); the glue between the antenna and the product may be stronger than the glue between an antenna and the NFC chip so that if the sticker is peeled off, the antenna and the NFC chip are disconnected. Alternatively, the NFC tag 107 may be sewn or otherwise attached to the physical object (e.g., when the NFC tag 107 is provided an inlay tag). As another example, the NFC tag 107 may be threaded through any hole in a product (e.g., through a shoelace hole or a handbag handle).

The NFC reader 105 may be provided as a software component. The NFC reader 105 may be provided as a hardware component. The application 109 may execute the NFC reader 105. The application 109 may be in communication with the NFC reader 105. The application 109 may be connected to the NFC reader 105.

Figure 1B:
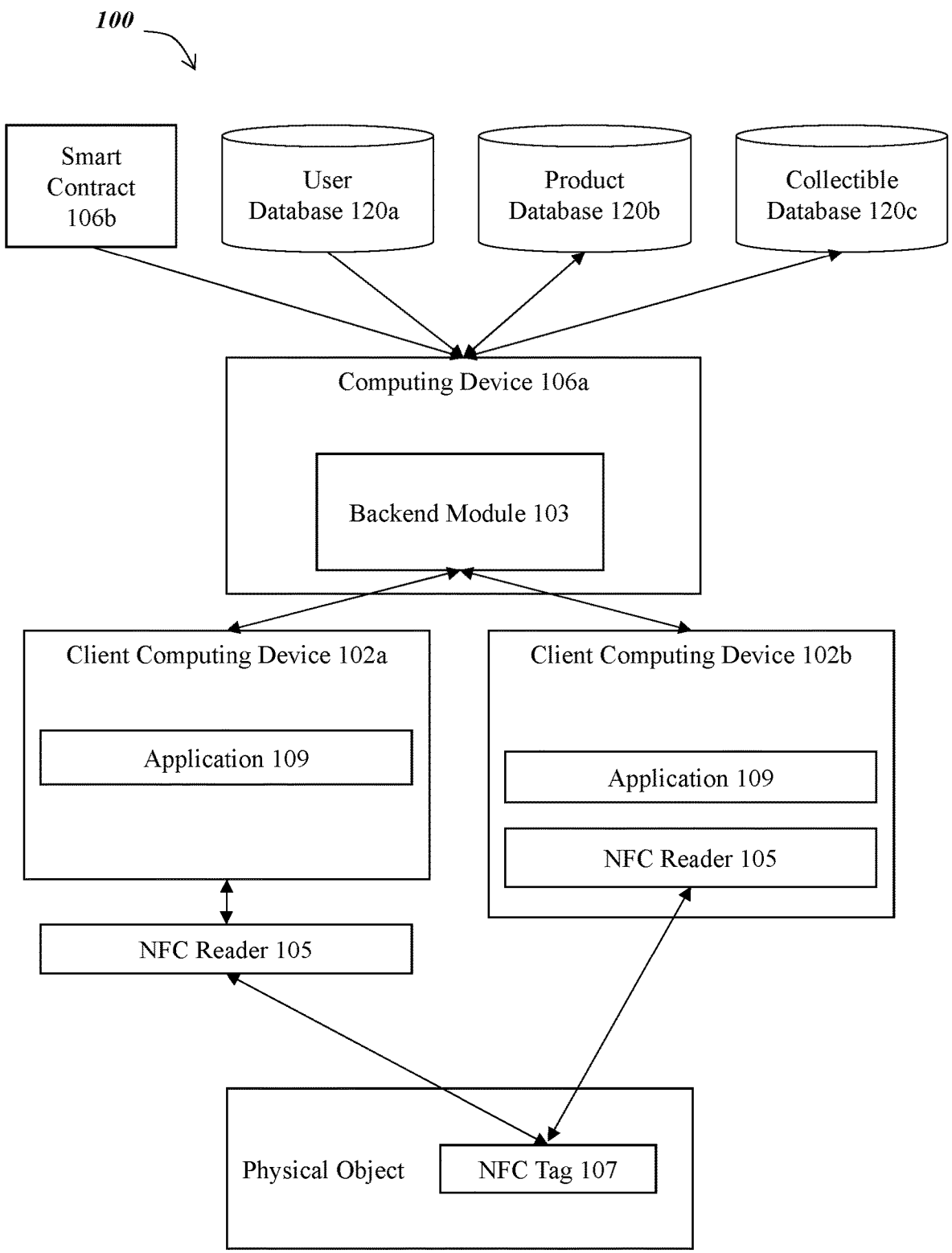
FIG. 1B is a block diagram depicting an embodiment of a system for authenticating physical products via NFC tags and recording authentication transactions on the blockchain.

Referring ahead to FIG. 1B, the system may include a client computing device 102a and a client computing device 102b. The client computing device 102a may, for example, include an application 109 and be in communication with an external NFC reader 105. The client computing device 102b may, for example, include both an application 109 and an internal NFC reader 105. The client computing device 102a may, for example, be a computing device used by a user to manage a product database 120b and to create one or more new collectibles—for example, a producer, authenticator, or reseller user may access a client computing device 102a. The client computing device 102b may, for example, be used by a user to manage one or more NFC tags 107 and allow a user to create a new collectible—for example, a consumer, a producer, authenticator, or reseller user may access a client computing device 102b.

Figure 1C:
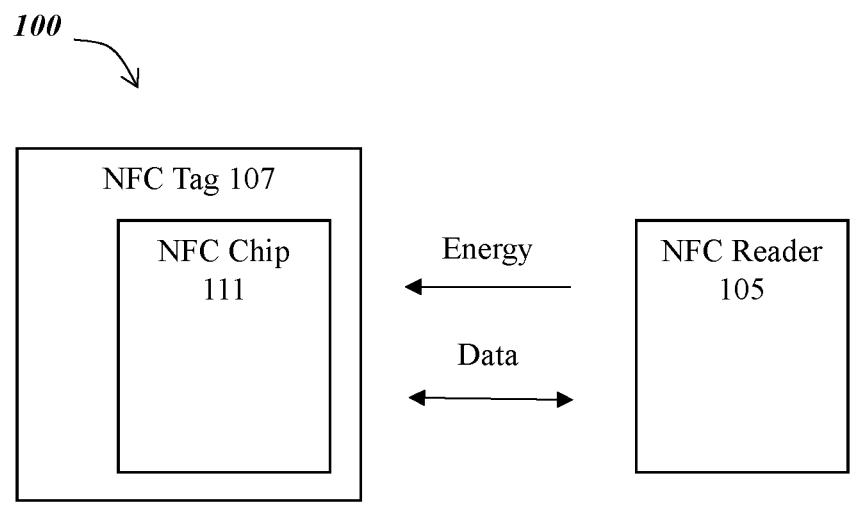
FIG. 1C is a block diagram depicting an embodiment of a system for authenticating physical products via NFC tags and recording authentication transactions on the blockchain.

Referring ahead to FIG. 1C, and as will be understood by those of skill in the art, NFC stands for Near-Field Communication, a method for communicating between devices when the devices are in close proximity to one another. An NFC reader 105 transmits electromagnetic waves to induce electric current in an NFC chip 111 of an NFC tag 107. The NFC chip 111 is powered in this way and does not need its own power source. In response to receiving the energy from the NFC reader 105, the NFC tag 107 transmits a string of characters to the NFC reader 105. The string of characters may include, by way of example, a tag URL stored in the NFC tag 107 as described above.

Referring back to FIG. 1A, the backend module 103 may include or be in communication with the user database 120a. The user database 120a may store data associated with each user of the system 100 including, without limitation, a user identifier, a user public address, a user name, and a user email address.

The backend module 103 may include or be in communication with the product database 120b. The product database 120b may store data associated with a type of product including, without limitation, a product identifier, a product name, a product photograph, and one or more product details (e.g., data describing one or more characteristics of the product).

The backend module 103 may include or be in communication with the collectibles database 120c. The collectibles database 120c may store data associated with a physical object including, without limitation, a product identifier for the type of product that the physical object is, a tag identifier of an NFC tag 107 associated with the physical object, and a user identifier if there is a current owner of the physical object.

In some embodiments, a user who owns a product may associate a new NFC tag 107 with the product directly from the application 109, which may, in such embodiments, allow for commissioning of new collectibles (e.g., in-app commissioning of products). In such embodiments, the user scans the "empty" (unassociated) NFC tag 107, selects a product from a user interface provided by the application 109, adds product details (e.g., clothing size or serial number), and scans the NFC tag 107 once again to save an association between the NFC tag 107 and the product. When a new product is created, it may also be automatically authenticated by the user who created it.

The user database 120a, the product database 120b, and the collectibles database 120c may be referred to generally as a database 120. A database 120 may be an ODBC-compliant database. For example, the database 120 may be provided as an ORACLE database, manufactured by Oracle Corporation of Redwood Shores, CA In other embodiments, the database 120 can be a Microsoft ACCESS database or a Microsoft SQL server database, manufactured by Microsoft Corporation of Redmond, WA In other embodiments, the database 120 can be a SQLite database distributed by Hwaci of Charlotte, NC, or a PostgreSQL database distributed by The PostgreSQL Global Development Group (including, by way of example, a PostgreSQL database hosted on a server provided as part of a GOOGLE Cloud Platform service). In still other embodiments, the database 120 may be a custom-designed database based on an open source database, such as the MYSQL family of freely available database products distributed by Oracle Corporation of Redwood City, CA In other embodiments, examples of databases include, without limitation, structured storage (e.g., NoSQL-type databases and BigTable databases), HBase databases distributed by The Apache Software Foundation of Forest Hill, MD, MongoDB databases distributed by ioGen, Inc., of New York, NY, an AWS DynamoDB distributed by Amazon Web Services and Cassandra databases distributed by The Apache Software Foundation of Forest Hill, MD In further embodiments, the database 120 may be any form or type of database.

Although, for ease of discussion, the application 109 and the NFC reader 105 are described in FIG. 1A-C as separate modules, it should be understood that this does not restrict the architecture to a particular implementation. Similarly, although the backend module 103, the smart contract 106b, the user database 120a, the product database 120b, and the collectibles database 120 are described in FIG. 1A as separate modules, it should be understood that this does not restrict the architecture to a particular implementation. For instance, these components may be encompassed by a single circuit or software function or, alternatively, distributed across a plurality of computing devices.

Figure 2:
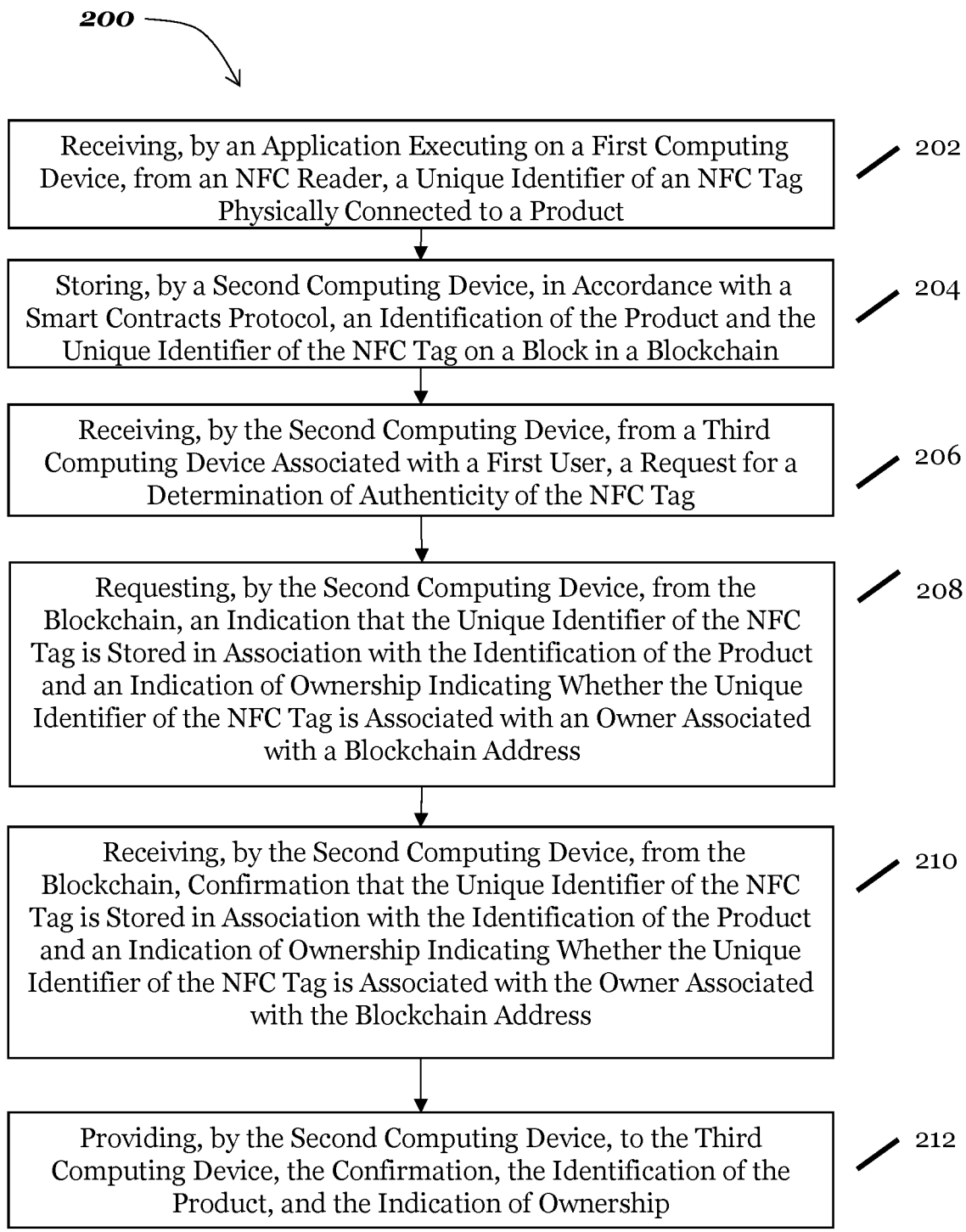
FIG. 2 is a flow diagram depicting an embodiment of a method for authenticating physical products via NFC tags and recording authentication transactions on the blockchain.

Referring now to FIG. 2, in brief overview, a block diagram depicts one embodiment of a method 200 for authenticating physical products via near field communication (NFC) tags and recording authentication transactions on a blockchain. The method 200 includes receiving, by an application executing on a first computing device, from an NFC reader, a unique identifier of an NFC tag physically connected to a product (202). The method 200 includes storing, by a second computing device, in accordance with a smart contracts protocol, an identification of the product and the unique identifier of the NFC tag on a block in a blockchain (204). The method 200 includes receiving, by the second computing device, from a third computing device associated with a first user, a request for a determination of authenticity of the NFC tag (206). The method 200 includes requesting, by the second computing device, from the blockchain, an indication of whether the unique identifier of the NFC tag is stored in association with the identification of the product and an indication of ownership indicating whether the unique identifier of the NFC tag is associated with an owner associated with a blockchain address (208). The method 200 includes receiving, by the second computing device, from the blockchain, confirmation that the unique identifier of the NFC tag is stored in association with the identification of the product and the indication of ownership indicating whether the unique identifier of the NFC tag is associated with the owner associated with the blockchain address (210). The method 200 includes providing, by the second computing device, to the third computing device, the confirmation, the identification of the product, and the indication of ownership (212).

Through the combined use of blockchain smart contracts and Internet of Things (IoT) components (including, e.g., the NFC tags), the methods and systems described herein provide immutable storage of a physical product's identity and ownership history.

Referring now to FIG. 2, in greater detail and in connection with FIGS. 1A-1C, the method 200 includes receiving, by an application executing on a first computing device, from an NFC reader, a unique identifier of an NFC tag physically connected to a product (202). This may occur in response to a user scanning the NFC tag 107 with the NFC reader 105. The NFC reader 105 may communicate with the NFC tag 107 and receive a unique response from the NFC tag 107, which the application 109 may use to communicate with the backend module 103 to create an initial association between the product and the NFC tag 107. The application 109 may transmit the unique identifier of the NFC tag 107 to the backend module 103. The backend module 103 may associate the unique identifier of the NFC tag 107 with the identification of the product (e.g., by recording the association in a database 120 and/or in the blockchain).

A second user may scan an NFC tag 107 with an NFC reader 105; the NFC reader 105 may receive a unique identifier of the NFC tag 107; the NFC reader 105 may transmit, to the application 109, the unique identifier of the NFC tag 107; the application 109 may transmit to the backend module 103, an instruction to associate the unique identifier of the NFC tag 107 with an identification of a particular product. For example, the second user may interact with a user interface displayed by the application 109 to identify a product (e.g., by brand name, model number, serial number, or other identifier of the product provided by the producer of the product, which may be determined by entering input that the application 109 uses to query the product database 120b) and provide input to the user interface of the application 109 to associate the identified product and the NFC tag 107. The backend module 103 may then receive an instruction from the application 109 to store the unique identifier of the NFC tag 107 and an indication of an association between the NFC tag 107 and the identification of the particular product in the blockchain; for example, by storing the data in a blockchain in accordance with a smart contracts protocol.

In one embodiment, the second user uses an NFC reader 105 external to the client computing device 102; in such an embodiment, the second user places the NFC tag 107 on the NFC reader 105. In another embodiment, the second user uses an NFC reader 105 embedded within or provided by the client computing device 102 (e.g., in an embodiment in which the client computing device 102 is a smartphone that includes an NFC reader 105); in such an embodiment, the user taps the NFC tag 107 with the smartphone 102. Therefore, in some embodiments, the method includes placing, by a second user, the NFC tag on the NFC reader; transmitting, by the NFC reader, to the application, an instruction to associate the unique identifier of the NFC tag with the identification of the product; and transmitting, by the application, to the second computing device, the instruction to associate the unique identifier of the NFC tag with the identification of the product.

The method 200 includes storing, by a second computing device, in accordance with a smart contracts protocol, an identification of the product and the unique identifier of the NFC tag on a block in a blockchain (204). The backend module 103 may transmit an instruction to the blockchain network node to retrieve, store, or modify data (e.g., as will be understood by those of skill in the art, a smart contract exists on a blockchain and a node provides access to blockchain data and functionality, which can be used to interact with a deployed smart contract).

The NFC tag 107 is physically connected to the product, either before or after the backend module 103 stores the indication of the association between the NFC tag 107 and the product. The NFC tag 107 may be sewn to the product (e.g., in the case of an item such a shoe or a purse or an item of clothing that has a fabric component). The NFC tag 107 may be built into the product (e.g., inside a tongue of a shoe). The NFC tag 107 may be attached to a component of the product (e.g., looped through a handle of a handbag). The NFC tag 107 may be adhered to a surface of the product to physically connect the NFC tag 107 to the product. In this way, an NFC tag 107 may be registered as associated with a physical object and physically connected to that physical object, which may be referred to as a "collectible." In some instances, the collectible may be created before the NFC tag 107 is physically connected to the product.

In some embodiments, the NFC tag 107 is not physically connected to the product. For example, a card tag may be provided for a product where physically attaching the NFC tag 107 is not possible, such as for a watch.

Each user of the system 100 may create an account in the application 109. The application 109 may create a blockchain address for the user with a randomly generated private key. The private key may be stored locally on the client computing device 102 and not shared with any of the other components of the system 100.

Features and product information available to a user may depend on one or more factors including, without limitation, access rights, trust levels, and relation with a product. By way of example, and without limitation, access rights may include only minimal access rights to read NFC tags and access product information (may be given to any user, even non-registered users); general rights to use the system 100 to register and manage their collectibles (may be given to any registered user); access rights to create collectibles; access rights to manage product databases; and access rights to collectibles statistics. By way of example, and without limitation, trust levels may include different levels for non-registered users, for registered users, for individually selected verified resellers, and for individually selected brand managers; trust levels may be assigned by, for example, associating a user identifier or account with an integer number or other symbol representing a level of trust. By way of example, and without limitation, user relations to products may include producer, authenticator, seller, buyer, owner. The system 100 may assign default access rights and trust levels for non-registered users and for registered users. The system 100 may assign customized access rights and trust levels for individual users. The system 100 may assign customized access rights and trust levels for individual products. In some embodiments, access rights, trust levels, and relation with products are all used in combination to decide which features and product data are made available for a particular product. One user may have different relations with different products, changing available features and information. By way of example, a user may be a producer of one brand A and have full access to products of brand A, but may only be a seller of brand B and have narrower access to products of brand B. At the same time, the same user may own a collectible of brand C and have only access to products of brand C available for collectible owners. The same user may also scan a product of brand D and have even narrower access because they do not own that product. As one example, more details about the ownership history of a product may be available to a current owner or a manufacturer of a product than to a general user. As another example, a brand manager may have access to manage information about products of the brand and display statistics about collectibles of the brand. As still another example, different users may have different abilities to create new brands and models of products within a database 120, different levels of access to information about a product (e.g., every user may access basic product details but there may be content, such as videos or links, that are available only to an owner), and different levels of ability to confirm authenticity of a collectible. As yet another example, users with specific trust levels may have access to confirm authenticity of a collectible.

The method 200 includes functionality for confirming authenticity of products and storing this confirmation on the blockchain (e.g., by transmitting, by the backend module 103, to the smart contract 106*b*, an instruction to store an indication of the confirmation of authenticity on the blockchain). The backend module 103 may determine, based on information received from the blockchain, that a product is an authentic product, thus confirming authenticity of the product. The backend module 103 may provide the determination of the confirmation of authenticity to the application 109.

In some embodiments, trust levels in combination with other factors (such as, without limitation, access rights and relation with a product) may determine which features are available to a user. As an example, in the case of authenticating collectibles, a user's level of trust is combined with other factors to determine if a user has access to authenticate collectibles of a particular brand.

A product may be authenticated by a plurality of users, each of the plurality of users having different trust levels. Furthermore, the product may have a different level of authenticity based on a trust level of one or more users that authenticated the product. For example, if a first user confirms that the product is authentic, the backend module 103 may assign a first level of authenticity to the product (and optionally store the assigned level on the blockchain); if a second user also confirms that the product is authentic, the backend module 103 may assign a second level of authenticity to the product, which may be a separate level than the first level or may be a modification to the first level to reflect the confirmation of authenticity by the second user (and optionally store the second level of authenticity on the blockchain). Information that may be stored includes, without limitation, an identification of a user who authenticated the product, a date of the authentication, a time of the authentication, and a trust level of the user who authenticated the product. If a third user scans the product to determine its level of authenticity, the third user may receive information about the level of authenticity of the product (e.g., as retrieved from the blockchain). A product may have a level of authenticity which is calculated based on the level of trust of the users who confirmed the authenticity of the product. Continuing with this example, a product (or "collectible) level of authenticity may be calculated based on a level of trust of one or more users authenticating it; for instance: if a collectible was authenticated by user A with trust level 1, the collectible's level of authenticity may be 1; if a collectible was authenticated by user A with trust level 1 and user B with trust level 3, its level of authenticity may be 3; if a collectible was authenticated by user B with trust level 3 and user C with trust level 3, its level of authenticity is 4 (e.g., in some instances, the level of authenticity may be higher than that of one or more users performing the authentication). Furthermore, the method 200 may include providing, by the second computing device, to the first computing device, the identification of the product, the confirmation, the indication of ownership, an enumeration of one or more users who confirmed the authenticity of the product, and an enumeration of a date and a time at which the enumerated one or more users confirmed the authenticity of the product.

The first user may be the owner of the product. The first user may be an individual seeking to confirm authenticity of the product prior to purchasing the product.

The second user may be the owner of the product. The second user may be a manufacturer or producer of the product, preparing the product for sale. The second user may be a trusted vendor or re-seller. The second user may be a type of user referred to as an authenticator and have special privileges granted by the system that are not available to other types of users; for examples, an authenticator may scan the NFC tag 107 of a product and authenticate it at any time. As another example, authenticators may scan a product, check if product details in the mobile app match the product, and confirm the authenticity; this confirmation is stored immutably on the blockchain.

The method 200 includes receiving, by the second computing device, from a third computing device associated with a first user, a request for a determination of authenticity of the NFC tag (206). Byway of example, the backend module 103 may receive the request from an application 109b (not shown) executing on a second client computing device 102b (not shown). As another example, the backend module 103 may receive the request from the application 109 executing on the client computing device 102.

The method 200 includes requesting, by the first computing device, from the blockchain, an indication of whether the unique identifier of the NFC tag is stored in association with the identification of the product and an indication of ownership indicating whether the unique identifier of the NFC tag is associated with an owner associated with a blockchain address (208). A response to the request may result in a response indicating that there is a record of an association between the NFC tag 107 and the product. The response may include an identification of a user associated with the NFC tag 107 and identified as the owner of the product. Alternatively, the response to the check for authenticity may result in a response indicating that there is no record of an association between the NFC tag 107 and the product (or that there is an association between the NFC tag 107 and a different product). As another alternative, the response to the check for authenticity may result in a response indicating that there is a record of an association between the NFC tag 107 and the product but no owner after the original manufacturer or producer of the product is associated with the NFC tag 107.

The method 200 includes receiving, by the second computing device, from the blockchain, confirmation that the unique identifier of the NFC tag is stored in association with the identification of the product and the indication of ownership indicating whether the unique identifier of the NFC tag is associated with the owner associated with the blockchain address (210). The backend module 103 may receive the confirmation. The indication of ownership may indicate that the unique identifier of the NFC tag 107 is associated with an owner having a blockchain address. The indication of ownership may indicate the unique identifier of the NFC tag 107 is associated with a user having a wallet address associated with a given blockchain. The owner may be the first user. The owner may be a manufacturer, producer, seller, re-seller, prior purchaser of the product, current owner of the product, or other user with an account with the system 100.

The method 200 may include determining, by the second computing device, a level of authenticity of the NFC tag, based upon the received confirmation that the unique identifier of the NFC tag is stored in association with the identification of the product and the indication of ownership indicating whether the unique identifier of the NFC tag is associated with the owner associated with the blockchain address. The method 200 may include providing, by the second computing device, to the third computing device, the determined level of authenticity.

The method 200 includes providing, by the second computing device, to the third computing device, the confirmation, the identification of the product, and the indication of ownership (212). The method 200 may include providing an identification of a user confirming authenticity of the product. The method 200 may include providing an identification of a date on which a user confirmed authenticity of the product.

The backend module 103 may receive an indication that the first user is identified as the owner of the product. The backend module 103 may direct the application 109 to display to the first user any collectibles in the first user's portfolio. By way of example, the application 109 may display all collectibles in the user's portfolio along with detailed information about each collectible including (but not limited to) a photo, model, size, price, who authenticated it, and the history of the collectible (including ownership, repair, maintenance, and other events). The application 109 may display additional information about the product including events that a user recorded as occurring during ownership of the product (although events can be recorded by users who did not own the product); for example, event details, date, and identifier may be created by a user, recorded on the blockchain (e.g., the backend module 103 may transmit an identification of the event to the smart contract 106b for recordation), and displayed in the application 109. Events may include, by way of example, and without limitation, service or rental of the product. The system 100 may determine whether or not to make functionality for recording events available to users based on one or more factors including, without limitation, access rights, trust levels, and relation with a product; for example, and without limitation, the system 100 may determine only selected users with trust level 2 which are also sellers of a product of brand A can record service event for any product of brand A or, as another example, that only the owner of a product can record a rental event.

The backend module 103 may authorize a display, by the application 109, of data available only to users identified as owners of products. The backend module 103 may, therefore, receive the confirmation and the indication of ownership; determine that the indication of ownership authorizes the first user to access otherwise restricted content (including, e.g., text, images, videos, and links to other such content); and instruct the application 109 to modify a display of a user interface to allow the first user to view the otherwise restricted content. Such content may include, without limitation, content and links generated by producers or manufacturers or brand manufacturers for product owners. Such content may include access to exclusive events or the opportunity to buy limited edition products. Such content may include access to different content based on a time and a location of a user (e.g., a user may receive a coupon or other promotional material if they own a football club's product and are in a stadium when the football club scores a goal). Brands and retailers are, therefore, given the opportunity to use their products as a communication channel and create a unique experience for the community of product owners. The content shared by the brands or retailers may itself be branded. For example, when a user scans a tag 107 on a product from a particular brand, the application 109 provides a branded user experience by, for example, changing visual elements (graphics, images, and colors) to match the style of a particular brand.

The application 109 may include functionality allowing a user to select a product owned by the user and identify the product as being for sale, including setting a sale price that is visible for other users of the system 100. For example, users may search for products or users using the application 109 and view the indication that the product is for sale. The application 109 may allow users to contact each other to buy and sell products. Each such transaction may then be recorded by the backend module 103 in the blockchain. Therefore the method 200 may include functionality allowing for sharing and reselling products with guaranteed authenticity, where the potential buyer can check both the authenticity of a product (by scanning NFC tag 107 attached to the product) and that the seller is the actual owner of the product (by receiving information from the blockchain, via the backend module 103 and the application 109).

The application 109 may provide functionality allowing users to access a social platform (e.g., hosted by the computing device 106a or by a third computing device 106c, not shown). The social platform may allow users to share content about one or more products and to interact with other users of the system 100. Users may create and maintain their profiles, including username, photo, biographical data, and optional contact data. Users may make their profiles publicly available so that other users can see their profiles and products in their portfolios. Users may search for other users to see their profiles and products in their portfolios. Users may search for products to see users who have particular products in their portfolios. Users may generate links (e.g., Uniform Resource Locators) to one or more products in their collection for sharing information about the product to other users, or to individuals who are not yet users of the system 100, by short message service, electronic mail, posting to other social media platforms, or other messaging protocol.

In some embodiments, the backend module 103 receives an indication that the unique identifier of the NFC tag 107 is not associated with an owner having a blockchain address. The backend module 103 may request an instruction from the application 109 regarding whether to associate the first user with the unique identifier of the NFC tag and the identification of the product. The backend module 103 may request an instruction from the application 109 regarding whether to remove the association to the manufacturing or producing user and add an association between the first user and the unique identifier of the NFC tag and the identification of the product. The application 109 may display a user interface to a user of the client computing device 102 requesting an instruction regarding whether to complete a transaction relating to ownership of the product connected to the NFC tag 107. The application 109 may transmit, to the backend module 103, an instruction to associate the unique identifier of the NFC tag with the identification of the product. The backend module 103 may associate the unique identifier of the NFC tag with the identification of the product.

The backend module 103 may receive an indication that the owner is an entity other than the first user and request, from the application 109, an instruction regarding whether to remove the association to the entity other than the first user and add an association between the first user and the unique identifier of the NFC tag and the identification of the product. The backend module 103 may request the instruction from a second application 109b (not shown) associated with the user identified as the owner to confirm the instruction to remove the association to the entity other than the first user and add an association between the first user and the unique identifier of the NFC tag and the identification of the product. For example, the backend module 103 may transmit a push notification to the current owner of a product indicating that there is a user requesting a transfer from the current owner; the current owner can confirm or deny the transfer. In such an example, users may transfer a product from one user to another without physical contact, allowing for sales without physical contact (e.g., sales transacted over the Internet). The backend module 103 may update an association between a unique identifier of the NFC tag 107 and a previous owner to indicate that the previous owner no longer owns the product. The backend module 103 may update an association between a unique identifier of the NFC tag 107 and a new owner to indicate that the new owner now owns the product. The backend module 103 may store a record of each transaction and/or request for a transaction on the blockchain.

Figure 3:
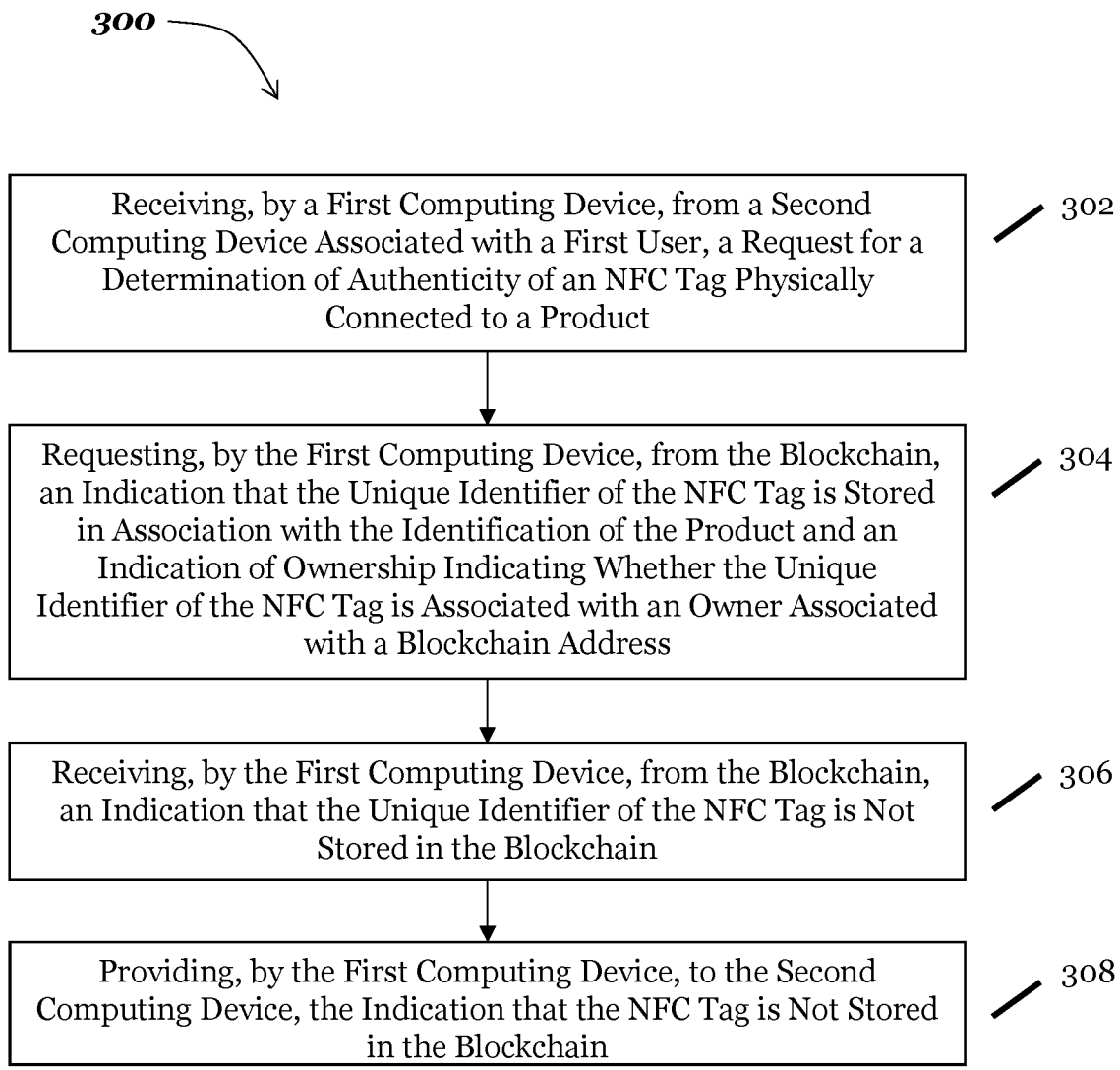
FIG. 3 is a flow diagram depicting an embodiment of a method for authenticating physical products via NFC tags and recording authentication transactions on the blockchain.

Referring now to FIG. 3, in brief overview, a block diagram depicts one embodiment of a method 300 for authenticating physical products via NFC tags and recording authentication transactions on a blockchain. The method 300 includes receiving, by a first computing device, from a second computing device associated with a first user, a request for a determination of authenticity of an NFC tag physically connected to a product (302). The method 300 includes requesting, by the first computing device, from a blockchain, an indication of whether the unique identifier of the NFC tag is stored in association with the identification of the product and an indication of ownership indicating whether the unique identifier of the NFC tag is associated with an owner associated with a blockchain address (304). The method 300 includes receiving, by the first computing device, from the blockchain, an indication that the unique identifier of the NFC tag is not stored in the blockchain (306). The method 300 includes providing, by the first computing device, to the second computing device, the indication that the NFC tag is not stored in the blockchain (308).

The method 300 includes receiving, by a first computing device, from a second computing device associated with a first user, a request for a determination of authenticity of an NFC tag physically connected to a product (302). Receiving the request may occur as described above in connection with FIG. 2, (206).

The method 300 includes requesting, by the first computing device, from a blockchain, an indication of whether the unique identifier of the NFC tag is stored in association with the identification of the product and an indication of ownership indicating whether the unique identifier of the NFC tag is associated with an owner associated with a blockchain address (304). Requesting the determination may occur as described above in connection with FIG. 2, (208).

The method 300 includes receiving, by the first computing device, from the blockchain, an indication that the unique identifier of the NFC tag is not stored in the blockchain (306). The unique identifier of the NFC tag may not be in the blockchain because the NFC tag is not a valid NFC tag 107 (e.g., it is a counterfeit). The unique identifier of the NFC tag may not be in the blockchain because the NFC tag has not previously been associated with the product; for example, as with a new product. Alternatively, the first computing device (e.g., the backend module 103 executing on the computing device 106a) may receive an indication that the unique identifier of the NFC tag is not stored in the blockchain is stored on the blockchain but is not associated with a user.

The method 300 includes providing, by the first computing device, to the second computing device, the indication that the NFC tag is not stored in the blockchain (308). The computing device 106a may direct a modification to a user interface of the application 109 to provide the user of the client computing device 102 additional information associated with the NFC tag. The information may include an indication that the NFC tag 107 is empty; that is, that no product is linked with the NFC tag 107 (in some such embodiments, the system 100 provides the user with functionality for linking a new product with an empty tag 107). The information may include an indication that the NFC tag 107 is an invalid tag; that is, the tag may have been decommissioned or tampered with. The information may include an indication that the NFC tag 107 is a tag that is not part of the system 100.

In some embodiments, the system 100 includes non-transitory, computer-readable medium comprising computer program instructions tangibly stored on the non-transitory computer-readable medium, wherein the instructions are executable by at least one processor to perform each of the steps described above in connection with FIGS. 2 and 3.

It should be understood that the systems described above may provide multiple ones of any or each of those components and these components may be provided on either a standalone machine or, in some embodiments, on multiple machines in a distributed system. The phrases 'in one embodiment,' 'in another embodiment,' and the like, generally mean that the particular feature, structure, step, or characteristic following the phrase is included in at least one embodiment of the present disclosure and may be included in more than one embodiment of the present disclosure. Such phrases may, but do not necessarily, refer to the same embodiment. However, the scope of protection is defined by the appended claims; the embodiments mentioned herein provide examples.

The terms "A or B", "at least one of A or/and B", "at least one of A and B", "at least one of A or B", or "one or more of A or/and B" used in the various embodiments of the present disclosure include any and all combinations of words enumerated with it. For example, "A or B", "at least one of A and B" or "at least one of A or B" may mean (1) including at least one A, (2) including at least one B, (3) including either A or B, or (4) including both at least one A and at least one B.

Any step or act disclosed herein as being performed, or capable of being performed, by a computer or other machine, may be performed automatically by a computer or other machine, whether or not explicitly disclosed as such herein. A step or act that is performed automatically is performed solely by a computer or other machine, without human intervention. A step or act that is performed automatically may, for example, operate solely on inputs received from a computer or other machine, and not from a human. A step or act that is performed automatically may, for example, be initiated by a signal received from a computer or other machine, and not from a human. A step or act that is performed automatically may, for example, provide output to a computer or other machine, and not to a human.

The systems and methods described above may be implemented as a method, apparatus, or article of manufacture using programming and/or engineering techniques to produce software, firmware, hardware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be LISP, PROLOG, PERL, C, C++, C#, JAVA, or any compiled or interpreted programming language.

Each such computer program may be implemented in a computer program product tangibly embodied in a machine-readable storage device for execution by a computer processor. Method steps may be performed by a computer processor executing a program tangibly embodied on a computer-readable medium to perform functions of the methods and systems described herein by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of computer-readable devices, firmware, programmable logic, hardware (e.g., integrated circuit chip; electronic devices; a computer-readable non-volatile storage unit; non-volatile memory, such as semiconductor memory devices, including EPROM, EEPROM, and flash memory devices; magnetic disks such as internal hard disks and removable disks; magneto-optical disks; and CD-ROMs). Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium. A computer may also receive programs and data (including, for example, instructions for storage on non-transitory computer-readable media) from a second computer providing access to the programs via a network transmission line, wireless transmission media, signals propagating through space, radio waves, infrared signals, etc.

Figure 4A:
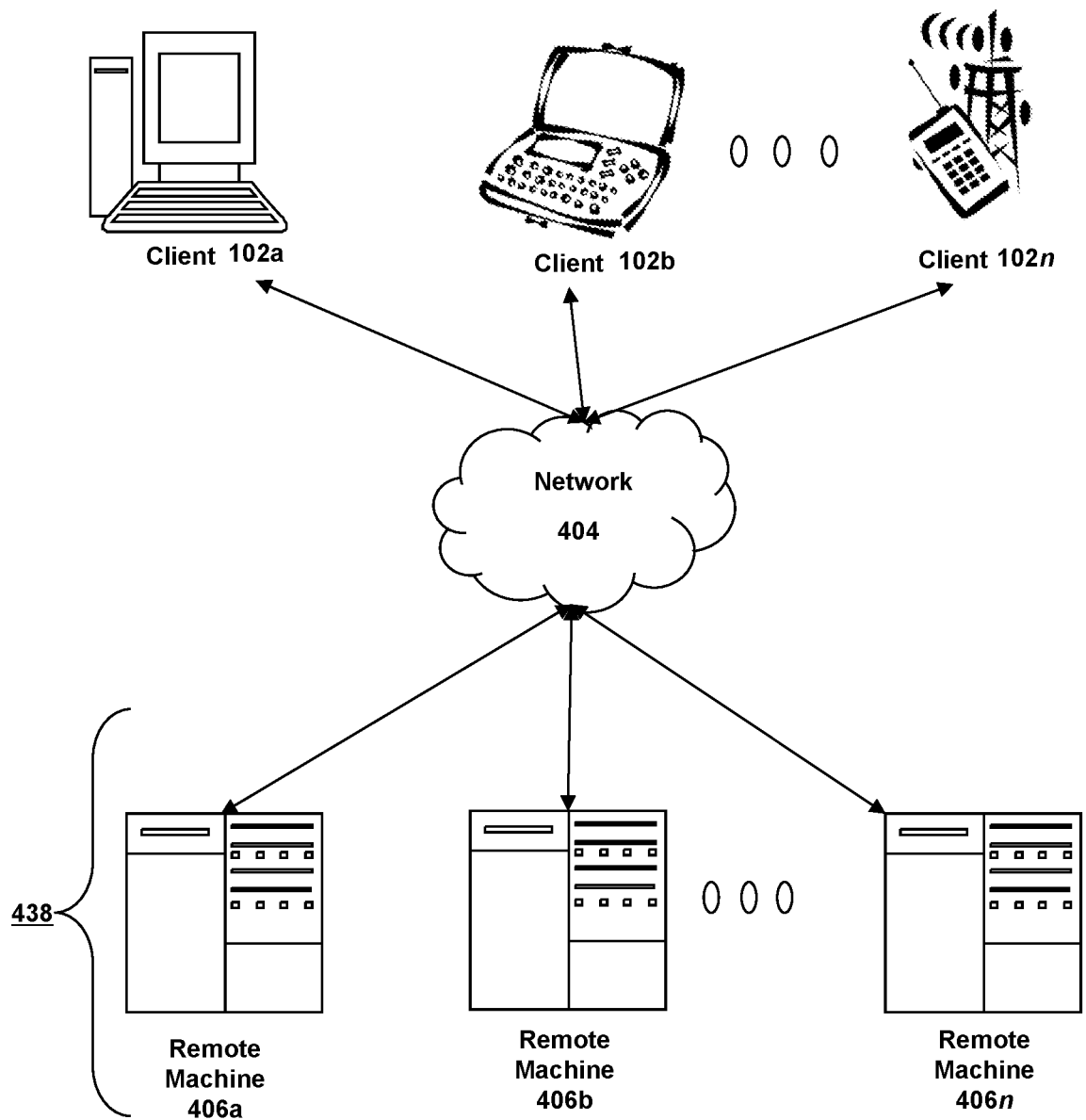
FIGS. 4A-4C are block diagrams depicting embodiments of computers useful in connection with the methods and systems described herein.
Figure 4B:
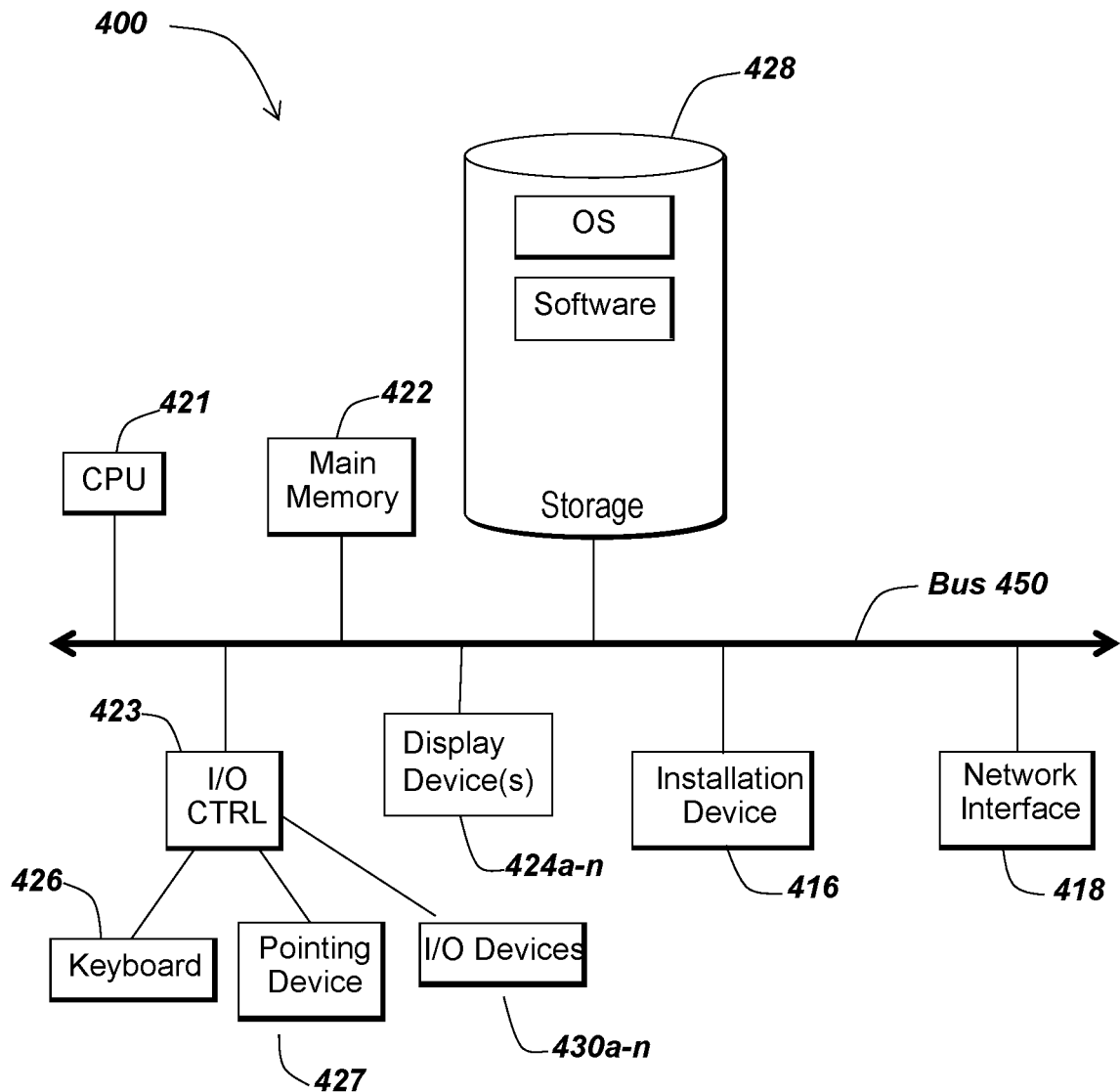
Figure 4C:
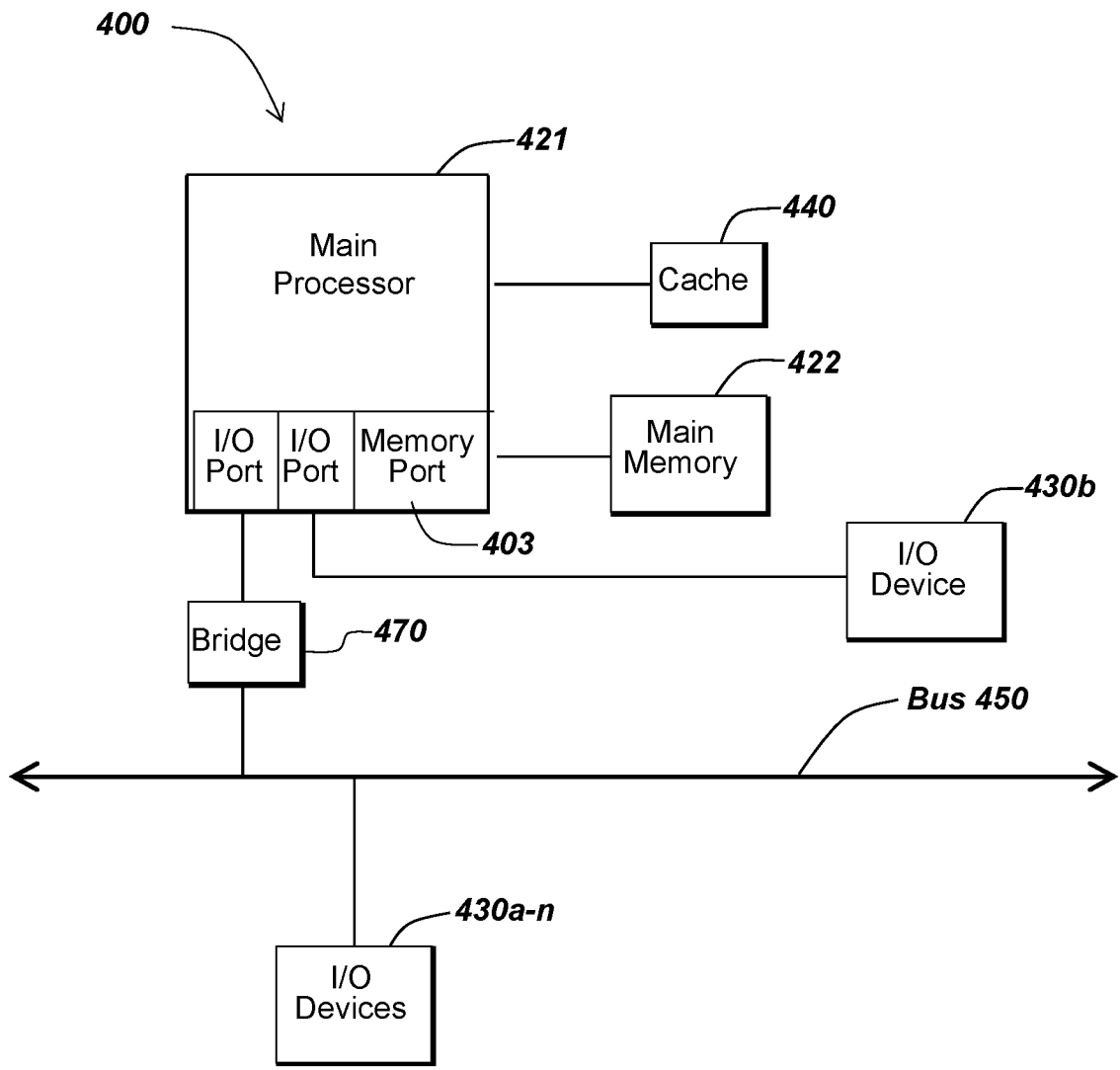

Referring now to FIGS. 4A, 4B, and 4C, block diagrams depict additional detail regarding computing devices that may be modified to execute novel, non-obvious functionality for implementing the methods and systems described above.

Referring now to FIG. 4A, an embodiment of a network environment is depicted. In brief overview, the network environment comprises one or more clients 402a-402n (also generally referred to as local machine(s) 402, client(s) 402, client node(s) 402, client machine(s) 402, client computer(s) 402, client device(s) 402, computing device(s) 402, endpoint(s) 402, or endpoint node(s) 402) in communication with one or more remote machines 406a-406n (also generally referred to as server(s) 406 or computing device(s) 406) via one or more networks 404.

Although FIG. 4A shows a network 404 between the clients 402 and the remote machines 406, the clients 402 and the remote machines 406 may be on the same network 404.

The network 404 can be a local area network (LAN), such as a company Intranet, a metropolitan area network (MAN), or a wide area network (WAN), such as the Internet or the World Wide Web. In some embodiments, there are multiple networks 404 between the clients 402 and the remote machines 406. In one of these embodiments, a network 404' (not shown) may be a private network and a network 404 may be a public network. In another of these embodiments, a network 404 may be a private network and a network 404' a public network. Instill another embodiment, networks 404 and 404' may both be private networks. In yet another embodiment, networks 404 and 404' may both be public networks.

The network 404 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, an SDH (Synchronous Digital Hierarchy) network, a wireless network, and a wireline network. In some embodiments, the network 404 may comprise a wireless link, such as an infrared channel or satellite band. The topology of the network 404 may be a bus, star, or ring network topology. The network 404 may be of any such network topology as known to those ordinarily skilled in the art capable of supporting the operations described herein. The network may comprise mobile telephone networks utilizing any protocol or protocols used to communicate among mobile devices (including tables and handheld devices generally), including AMPS, TDMA, CDMA, GSM, GPRS, UMTS, or LTE. In some embodiments, different types of data may be transmitted via different protocols. In other embodiments, the same types of data may be transmitted via different protocols.

A client 102 and a remote machine 106 can be any workstation, desktop computer, laptop or notebook computer, server, portable computer, mobile telephone, mobile smartphone, or other portable telecommunication device, media playing device, a gaming system, mobile computing device, or any other type and/or form of computing, telecommunications or media device that is capable of communicating on any type and form of network and that has sufficient processor power and memory capacity to perform the operations described herein. A client 402 may execute, operate or otherwise provide an application, which can be any type and/or form of software, program, or executable instructions, including, without limitation, any type and/or form of web browser, web-based client, client-server application, an ActiveX control, or a JAVA applet, or any other type and/or form of executable instructions capable of executing on client 102.

In one embodiment, a computing device 106 provides functionality of a web server. The web server may be any type of web server, including web servers that are open-source web servers, web servers that execute proprietary software, and cloud-based web servers where a third party hosts the hardware executing the functionality of the web server. In some embodiments, a web server 106 comprises an open-source web server, such as the APACHE servers maintained by the Apache Software Foundation of Delaware. In other embodiments, the web server executes proprietary software, such as the INTERNET INFORMATION SERVICES products provided by Microsoft Corporation of Redmond, WA, the ORACLE IPLANET web server products provided by Oracle Corporation of Redwood Shores, CA, or the ORACLE WEBLOGIC products provided by Oracle Corporation of Redwood Shores, CA.

In some embodiments, the system may include multiple, logically-grouped remote machines 106. In one of these embodiments, the logical group of remote machines may be referred to as a server farm 438. In another of these embodiments, the server farm 438 may be administered as a single entity.

FIGS. 4B and 4C depict block diagrams of a computing device 400 useful for practicing an embodiment of the client 102 or a remote machine 106. As shown in FIGS. 4B and 4C, each computing device 400 includes a central processing unit 421, and a main memory unit 422. As shown in FIG. 4B, a computing device 400 may include a storage device 428, an installation device 416, a network interface 418, an I/O controller 423, display devices 424*a-n*, a keyboard 426, a pointing device 427, such as a mouse, and one or more other I/O devices 430*a-n*. The storage device 428 may include, without limitation, an operating system and software. As shown in FIG. 4C, each computing device 400 may also include additional optional elements, such as a memory port 403, a bridge 470, one or more input/output devices 430*a-n* (generally referred to using reference numeral 430), and a cache memory 440 in communication with the central processing unit 421.

The central processing unit 421 is any logic circuitry that responds to and processes instructions fetched from the main memory unit 422. In many embodiments, the central processing unit 421 is provided by a microprocessor unit, such as: those manufactured by Intel Corporation of Mountain View, CA; those manufactured by Motorola Corporation of Schaumburg, IL; those manufactured by Transmeta Corporation of Santa Clara, CA; those manufactured by International Business Machines of White Plains, NY; or those manufactured by Advanced Micro Devices of Sunnyvale, CA Other examples include SPARC processors, ARM processors, processors used to build UNIX/LINUX "white" boxes, and processors for mobile devices. The computing device 400 may be based on any of these processors, or any other processor capable of operating as described herein.

Main memory unit 422 may be one or more memory chips capable of storing data and allowing any storage location to be directly accessed by the microprocessor 421. The main memory 422 may be based on any available memory chips capable of operating as described herein. In the embodiment shown in FIG. 4B, the processor 421 communicates with main memory 422 via a system bus 450. FIG. 4C depicts an embodiment of a computing device 400 in which the processor communicates directly with main memory 422 via a memory port 403. FIG. 4C also depicts an embodiment in which the main processor 421 communicates directly with cache memory 440 via a secondary bus, sometimes referred to as a backside bus. In other embodiments, the main processor 421 communicates with cache memory 440 using the system bus 450.

In the embodiment shown in FIG. 4B, the processor 421 communicates with various I/O devices 430 via a local system bus 450. Various buses may be used to connect the central processing unit 421 to any of the I/O devices 430, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 424, the processor 421 may use an Advanced Graphics Port (AGP) to communicate with the display 424. FIG. 4C depicts an embodiment of a computing device 400 in which the main processor 421 also communicates directly with an I/O device 430*b* via, for example, HYPERTRANSPORT, RAPIDIO, or INFINI-BAND communications technology.

One or more of a wide variety of I/O devices 430a-n may be present in or connected to the computing device 400, each of which may be of the same or different type and/or form. Input devices include keyboards, mice, trackpads, trackballs, microphones, scanners, cameras, and drawing tablets. Output devices include video displays, speakers, inkjet printers, laser printers, 3D printers, and dye-sublimation printers. The I/O devices may be controlled by an I/O controller 423 as shown in FIG. 4B. Furthermore, an I/O device may also provide storage and/or an installation medium 416 for the computing device 400. In some embodiments, the computing device 400 may provide USB connections (not shown) to receive handheld USB storage devices such as the USB Flash Drive line of devices manufactured by Twintech Industry, Inc. of Los Alamitos, CA.

Referring still to FIG. 4B, the computing device 400 may support any suitable installation device 416, such as a floppy disk drive for receiving floppy disks such as 3.5-inch, 5.25-inch disks or ZIP disks; a CD-ROM drive; a CD-R/RW drive; a DVD-ROM drive; tape drives of various formats; a USB device; a hard-drive or any other device suitable for installing software and programs. In some embodiments, the computing device 400 may provide functionality for installing software over a network 404. The computing device 400 may further comprise a storage device, such as one or more hard disk drives or redundant arrays of independent disks, for storing an operating system and other software. Alternatively, the computing device 400 may rely on memory chips for storage instead of hard disks.

Furthermore, the computing device 400 may include a network interface 418 to interface to the network 404 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, 802.15.4, Bluetooth, ZIGBEE, CDMA, GSM, WiMax, and direct asynchronous connections). In one embodiment, the computing device 400 communicates with other computing devices 400' via any type and/or form of gateway or tunneling protocol such as Secure Socket Layer (SSL) or Transport Layer Security (TLS). The network interface 418 may comprise a built-in network adapter, network interface card, PCMCIA network card, card bus network adapter, wireless network adapter, USB network adapter, modem, or any other device suitable for interfacing the computing device 400 to any type of network capable of communication and performing the operations described herein.

In further embodiments, and I/O device 430 may be a bridge between the system bus 450 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 400 of the sort depicted in FIGS. 4B and 4C typically operates under the control of operating systems, which control scheduling of tasks and access to system resources. The computing device 400 can be running any operating system such as any of the versions of the MICROSOFT WINDOWS operating systems, the different releases of the UNIX and LINUX operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 3.x, WINDOWS 95, WINDOWS 98, WINDOWS 2000, WINDOWS NT 3.51, WINDOWS NT 4.0, WINDOWS CE, WINDOWS XP, WINDOWS 7, WINDOWS 8, WINDOWS VISTA, and WINDOWS 10 all of which are manufactured by Microsoft Corporation of Redmond, WA; MAC OS manufactured by Apple Inc. of Cupertino, CA; OS/2 manufactured by International Business Machines of Armonk, NY; Red Hat Enterprise Linux, a Linux-variant operating system distributed by Red Hat, Inc., of Raleigh, NC; Ubuntu, a freely-available operating system distributed by Canonical Ltd. of London, England; or any type and/or form of a Unix operating system, among others.

Having described certain embodiments of methods and systems for authenticating physical products via NFC tags and recording authentication transactions on the blockchain, it will be apparent to one of skill in the art that other embodiments incorporating the concepts of the disclosure may be used. Therefore, the disclosure should not be limited to certain embodiments, but rather should be limited only by the spirit and scope of the following claims.

What is claimed is:

1. A method for authenticating physical products via near field communication (NFC) tags and recording authentication transactions on a blockchain, the method comprising:

receiving, by an application executing on a first computing device, from an NFC reader, a unique identifier of an NFC tag physically connected to a product;

storing, by a second computing device, in accordance with a smart contracts protocol, an identification of the product and the unique identifier of the NFC tag on a block in a blockchain;

receiving, by the second computing device, from a second application executing on a third computing device associated with a first user, a request for a determination of authenticity of the NFC tag;

requesting, by the second computing device, from the blockchain, an indication of whether the unique identifier of the NFC tag is stored in association with the identification of the product and an indication of ownership indicating whether the unique identifier of the NFC tag is associated with an owner associated with a blockchain address;

receiving, by the second computing device, from the blockchain, confirmation that the unique identifier of the NFC tag is stored in association with the identification of the product and the indication of ownership indicating whether the unique identifier of the NFC tag is associated with the owner associated with the blockchain address, wherein the owner associated with the blockchain address is a second user;

providing, by the second computing device, to the third computing device, the confirmation, the identification of the product, and the indication of ownership;

receiving, by the second computing device, from the third computing device, an instruction to remove the association to the second user and add an association between the first user and the unique identifier of the NFC tag and the identification of the product;

updating, by the second computing device, a database storing the association between the unique identifier of the NFC tag and the second user to indicate that the first user is the owner of the product;

storing, by the second computing device, on the blockchain, a record of the association of the first user with the unique identifier of the NFC tag and the identification of the product; and modifying, by the second application, a visual element of the second application to match a style of a brand associated with the identification of the product to provide a branded user experience, based upon the updating of the database to store the association between the the unique identifier of the NFC tag and the second user to indicate that the first user is the owner of the product.

2. The method of claim 1 further comprising, at a time prior to physical connection of the NFC tag to the product:
placing, by a second user, the NFC tag on the NFC reader;
transmitting, by the NFC reader, to the application, an instruction to associate the unique identifier of the NFC tag with the identification of the product; and
transmitting, by the application, to the second computing device, the instruction to associate the unique identifier of the NFC tag with the identification of the product.

3. The method of claim 1 further comprising transmitting, by the application, to the second computing device, an instruction to associate the unique identifier of the NFC tag with the identification of the product.

4. The method of claim 3 further comprising associating, by the second computing device, the unique identifier of the NFC tag with the identification of the product.

5. The method of claim 1 further comprising sewing the NFC tag into the product to physically connect the NFC tag to the product.

6. The method of claim 1 further comprising adhering the NFC tag to a surface of the product to physically connect the NFC tag to the product.

7. The method of claim 1, wherein the owner is an entity other than the first user.

8. The method of claim 7 further comprising requesting, by the second computing device, an instruction from the third computing device regarding whether to remove the association to the entity other than the first user and add an association between the first user and the unique identifier of the NFC tag and the identification of the product.

9. The method of claim 1, wherein receiving, by the second computing device, from the blockchain, the indication of ownership further comprises receiving, by the second computing device, from the blockchain, an indication of ownership indicating that the unique identifier of the NFC tag is not associated with an owner having a blockchain address.

10. The method of claim 9 further comprising requesting, by the second computing device, an instruction from the third computing device regarding whether to associate the first user with the unique identifier of the NFC tag and the identification of the product.

11. The method of claim 1 further comprising determining, by the second computing device, a level of authenticity of the NFC tag, based upon the received confirmation that the unique identifier of the NFC tag is stored in association with the identification of the product and the indication of ownership indicating whether the unique identifier of the NFC tag is associated with the owner associated with the address associated with the blockchain.

12. The method of claim 11, wherein providing further comprises providing the determination of the level of authenticity.

13. The method of claim 1, wherein providing further comprises providing an identification of a user confirming authenticity of the product.

14. The method of claim 1, wherein providing further comprises providing an identification of a date on which a user confirmed authenticity of the product.

15. The method of claim 1, wherein providing further comprises providing an enumeration of one or more users who confirmed the authenticity of the product.

* * * * *